(12) United States Patent
Saghier et al.

(10) Patent No.: US 7,996,332 B1
(45) Date of Patent: Aug. 9, 2011

(54) METHOD AND SYSTEM FOR FORECASTING USAGE COSTS AND COMPUTER CAPACITY

(75) Inventors: Dean Lee Saghier, Olathe, KS (US); Richard Michael Wyett, Spring Hill, KS (US); Jianzhou Chen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 90 days.

(21) Appl. No.: 12/469,895

(22) Filed: May 21, 2009

Related U.S. Application Data

(60) Division of application No. 10/991,015, filed on Nov. 17, 2004, now Pat. No. 7,590,508, which is a continuation-in-part of application No. 10/971,985, filed on Oct. 22, 2004, now Pat. No. 7,369,981.

(51) Int. Cl.
*G06F 17/00* (2006.01)
*G06F 15/00* (2006.01)
*G06F 15/173* (2006.01)
*G06F 9/46* (2006.01)

(52) U.S. Cl. ....... 705/400; 705/7.38; 702/182; 709/226; 718/104

(58) Field of Classification Search .......... 702/182, 702/186, 179; 703/22, 2; 706/21; 709/226; 718/104; 714/E11.197, E11.192; 705/400, 705/7, 8, 7.11–7.29, 7.38, 7.39, 28, 29, 30, 705/1.1
See application file for complete search history.

(56) References Cited

U.S. PATENT DOCUMENTS

| | | | |
|---|---|---|---|
| 5,375,070 A | 12/1994 | Hershey et al. | |
| 5,684,994 A | 11/1997 | Tanaka et al. | |
| 6,044,335 A | 3/2000 | Ksendzov | |
| 6,148,335 A | 11/2000 | Haggard et al. | |
| 6,330,552 B1 | 12/2001 | Farrar et al. | |
| 6,377,907 B1 | 4/2002 | Waclawski | |
| 6,876,988 B2 | 4/2005 | Helsper et al. | |
| 6,978,257 B1 | 12/2005 | Halbout et al. | |
| 7,031,988 B2 | 4/2006 | Kusama et al. | |
| 7,058,708 B2 | 6/2006 | Gold et al. | |
| 7,320,131 B1 | 1/2008 | O'Toole, Jr. | |
| 7,325,234 B2 * | 1/2008 | Smith | 718/104 |
| 7,421,413 B2 | 9/2008 | Frank et al. | |
| 7,533,007 B2 * | 5/2009 | Helander et al. | 703/2 |

(Continued)

FOREIGN PATENT DOCUMENTS

JP 200337553 2/2003

OTHER PUBLICATIONS

Wu et al., Combining Artificial Neural Networks and Statistics for Stock-Market Forecasting; College of Arts and Sciences; California State University; San Marcos, CA 92069; 1993; 8 pages.

(Continued)

*Primary Examiner* — Igor Borissov

(57) ABSTRACT

The present invention provides at least a method and system for forecasting usage costs and computer capacity. With respect to the present invention, performance data and information related to transactions collected from computing devices are used to calculate correlations. A cost-allocation factor is calculated to determine the computer's usage costs without a long manual analysis of large volumes of data and extensive testing. Performance data and transaction data are used to forecast computer capacity.

6 Claims, 5 Drawing Sheets

U.S. PATENT DOCUMENTS

2002/0188576 A1 12/2002 Peterson et al.
2004/0111382 A1 6/2004 Haji-Ioannou
2005/0004879 A1 1/2005 Mathias et al.
2005/0144025 A1 6/2005 Katz et al.
2005/0193002 A1 9/2005 Souders et al.

OTHER PUBLICATIONS

U.S. Appl. No. 10/991,015 Office Action Mailed Oct. 1, 2008.
U.S. Appl. No. 10/991,015 Office Action Mailed Jul. 17, 2008.

* cited by examiner

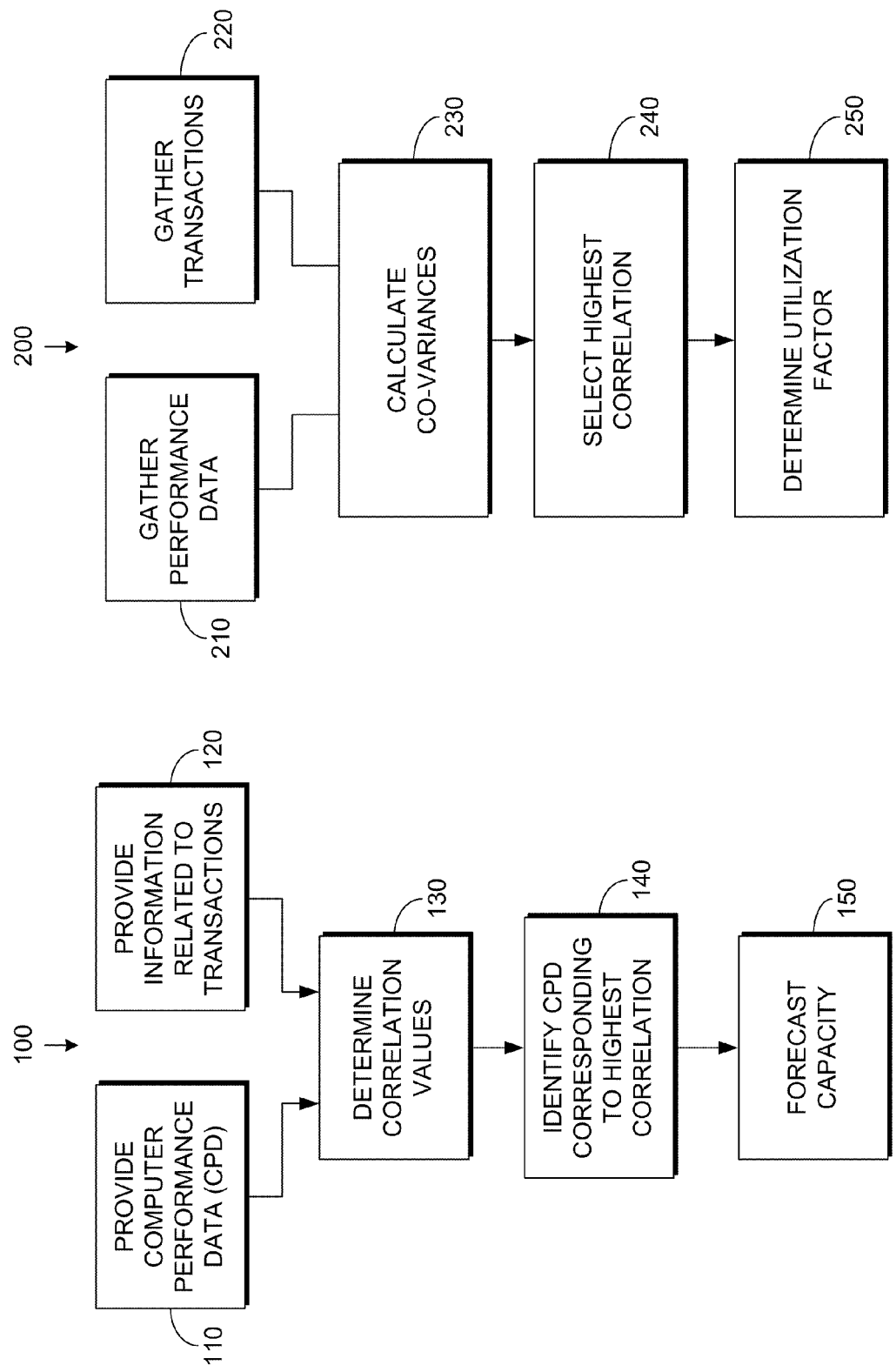

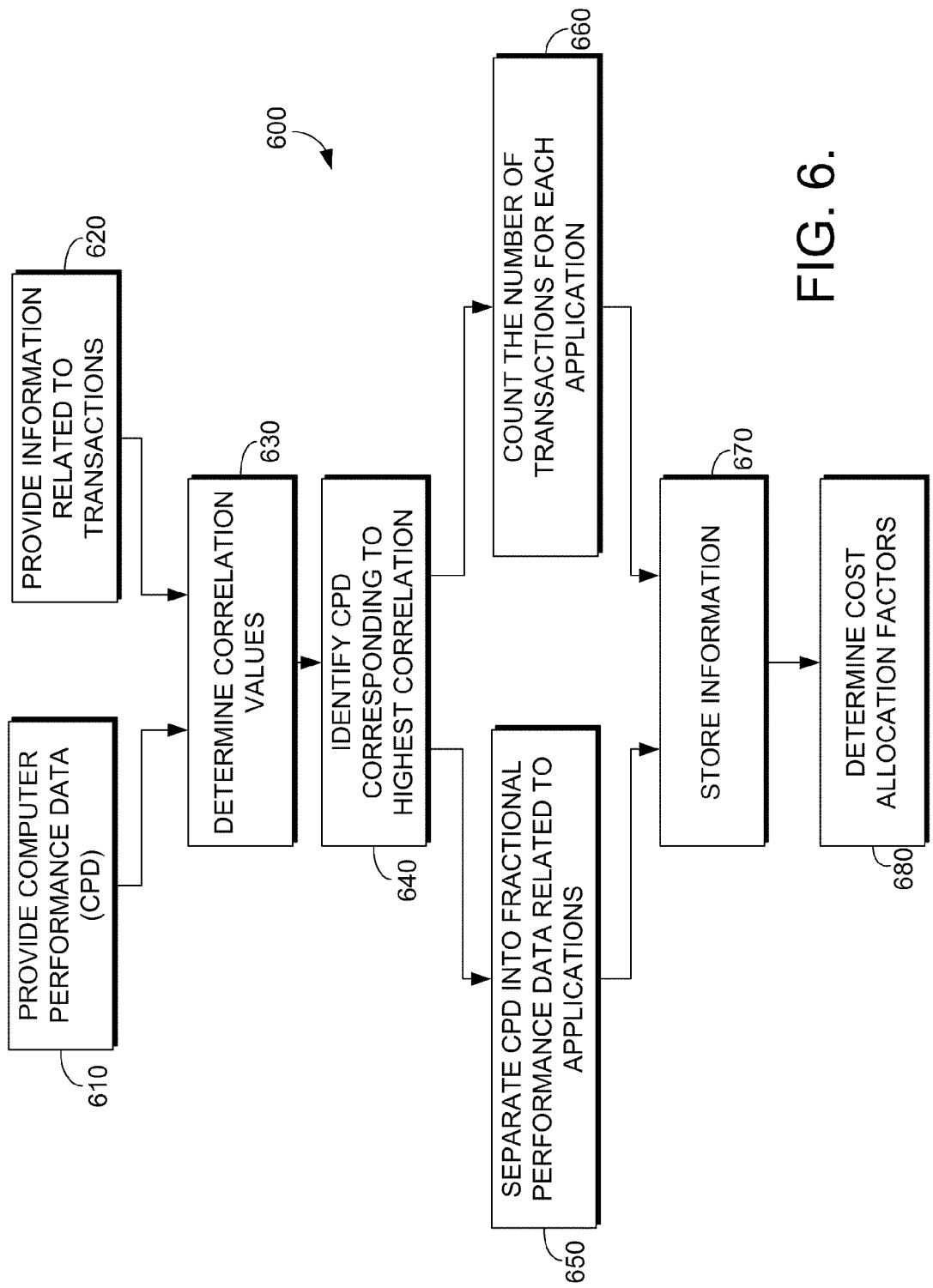

METHOD AND SYSTEM FOR FORECASTING USAGE COSTS AND COMPUTER CAPACITY

CROSS-REFERENCE TO RELATED APPLICATIONS

The present application is a divisional of prior application Ser. No. 10/991,015, filed Nov. 17, 2004, which is a continuation-in-part (CIP) of prior application Ser. No. 10/971,985, now U.S. Pat. No. 7,369,981, filed Oct. 22, 2004. The prior applications are hereby incorporated by reference.

STATEMENT REGARDING FEDERALLY SPONSORED RESEARCH OR DEVELOPMENT

Not applicable.

TECHNICAL FIELD

This invention relates to the field of computer usage costs and capacity planning and system utilization.

BACKGROUND OF THE INVENTION

As the population becomes increasingly dependent on computing resources, the need for more computers and access to them becomes larger and more important. Today, millions of people use computing devices with an ever increasing need to have access to them. As a consequence, computing administrators need to be able to accommodate this need and be able to adapt to the volume of software instructions given to computing devices by the many users as well as the numerous applications that run on them. However, a problem remains as to how to adequately determine when a computer has reached its maximum or some desired capacity. For example, a typical computer may need to handle millions of instructions from a few applications but also may need to handle a group of new users. A challenge is to be able to forecast when a computer or set of computers has reached its capacity in executing both instruction sets from the various applications running on it as well as its ability to handle an increasing number of users wanting access to computing resources.

In the past, thorough testing was required to stress test a system to determine a computer's expected capacity which is a trial-by-error approach. The process entailed estimating the expected transaction volumes that may push a computer beyond its ability to complete transactions in question. Because of the variety of transactions and types of computers, the testing method would get expensive and be time consuming in determining the right mix of transactions to use and estimating the correct load inputs to be placed on the types of computers. The maximum capacity would be observed if the transaction volume pushed the computer beyond its threshold. Setting up and maintaining a testing environment is an expensive, resource-intensive process. Moreover, testing environments are not the same as real-world production environments.

In today's world, numerous computers are dispersed throughout many networks covering a range of applications and activities. The expectation is that these computers are always working to provide the response time as defined in contracted service level agreements. Unfortunately, users and application executions are increasing at an alarming rate placing enormous burdens on system resources. A challenge has become a battle to keep pace with these demands by checking and maintaining computers very often to insure that they can handle the capacity needs placed upon them by the ever increasing number of users and demand for executing more applications.

BRIEF SUMMARY OF THE INVENTION

This disclosure describes, among other things, methods and system to determine usage costs and to quantify theoretical maximum transactions capacity of a computer without extensive testing. By analyzing a computer's transactions and performance data to establish a high correlation, a theoretical capacity threshold may be calculated for any computer. The present invention has several practical applications in the technical arts, including eliminating the need of determining upfront the number of transactions that need to be executed on the computer to calculate the theoretical capacity limit of the computer and eliminating the need to perform extensive testing by placing artificial software loads on the computer to estimate the theoretical capacity limit.

In a first aspect, a method for forecasting usage costs is provided. The method includes identifying computer-performance data (CPD) related to a number of transactions processed by an application running on a computing device during a first span of time; counting the number of transactions associated with the application; communicating CPD and the number of transactions to a data structure; determining a cost-allocation factor from the CPD and the number of transactions; and without user interaction repeating the above-mentioned steps to determine cost-allocation factors for additional applications to forecast usage costs.

In a second aspect, a computer-implemented method for forecasting computer capacity is provided. The method includes identifying CPD related to a first number of transactions processed by an application running on a computing device during a first span of time; counting the first number of transactions associated with the application; communicating CPD and the first number of transactions to a data structure; populating the data structure with dummy CPD and a second number of dummy transactions at a ratio equal to the previously obtained CPD and first number of transactions until a sum of all the CPD and dummy CPD reaches a capacity threshold, wherein a capacity for the computing device can be derived from the corresponding aggregate of the first number of transactions and second number of dummy transactions; and without user interaction repeating the above-mentioned steps to forecast capacity for additional applications.

In a third aspect, a computer-implemented method for forecasting usage costs is provided. The method includes providing CPD that is associated with a computing device and a span of time; providing information related to a set of transactions that are facilitated by the computing device during the same span of time; determining correlation values that depict respective correlations between each of the CPD sets and the information; identifying a particular set of CPD that has the highest correlation value; segregating the CPD into fractional-performance data related to the applications running on the computing device; counting the information into numeric values associated to the applications; communicating the fractional-performance data and the numeric values to a data structure; and determining respectively a cost-allocation factor for the applications from the fractional-performance data and the numeric values to forecast usage costs.

In a fourth aspect, media having computer-useable instructions embodied thereon for performing a method of forecasting computer usage costs is provided. The method includes periodically gathering performance data and transaction data from a computer; determining correlation factors between the performance data and the transactions data for a common time period; selecting a highest correlation; separating the performance data into fractional-performance data related to applications running on the computer; separating transactions data into numeric values associated with the applications; communicating the fractional-performance data and the numeric values to a data structure; and determining respectively a cost-allocation factor for the applications from the fractional-performance data and numeric values to forecast computer usage costs.

In a final illustrative aspect, a system for forecasting usage costs is provided. The system includes a first computing device operable to execute transactions within applications, to operate computing hardware, to generate performance data on the applications and computing hardware, and to generate information related to transactions; at least one data structure operable to collect and store one or more sets of performance data related to the computing device and collect and store information associated to transactions from the first computing device; at least a second computing device operable to manipulate performance data and information associated to transactions in the at least one data structure to determine a set of correlation values that depict respective correlations between each of the performance data and the information, to identify a particular set of performance data that corresponds to the highest correlation value of the set of correlation values, and to separate the particular set of performance data into one or more fractional-performance data respectively related to the applications, to count the information into numeric values respectively related to the applications, and to determine respectively a cost-allocation factor for the applications from the fractional-performance data and the numeric values to forecast usage costs; and a set of links operable to interconnect at least one of the first computing device, at least one of the data structure, and at least one of the second computing device to facilitate the transfer of data back and forth.

BRIEF DESCRIPTION OF THE SEVERAL VIEWS OF THE DRAWINGS

The present invention is described in detail below with reference to the attached drawing figures, which are incorporated herein by reference, and wherein:

FIG. 1 is a flowchart illustrating an exemplary process for determining theoretical capacity of a computer in accordance with an embodiment of the present invention.

FIG. 2 is a flowchart illustrating an exemplary process for determining a utilization factor in accordance with an embodiment of the present invention.

FIG. 6 is a flowchart illustrating an exemplary process for determining cost-allocation factors in accordance with an embodiment of the present invention.

DETAILED DESCRIPTION OF THE INVENTION

Figure 3:
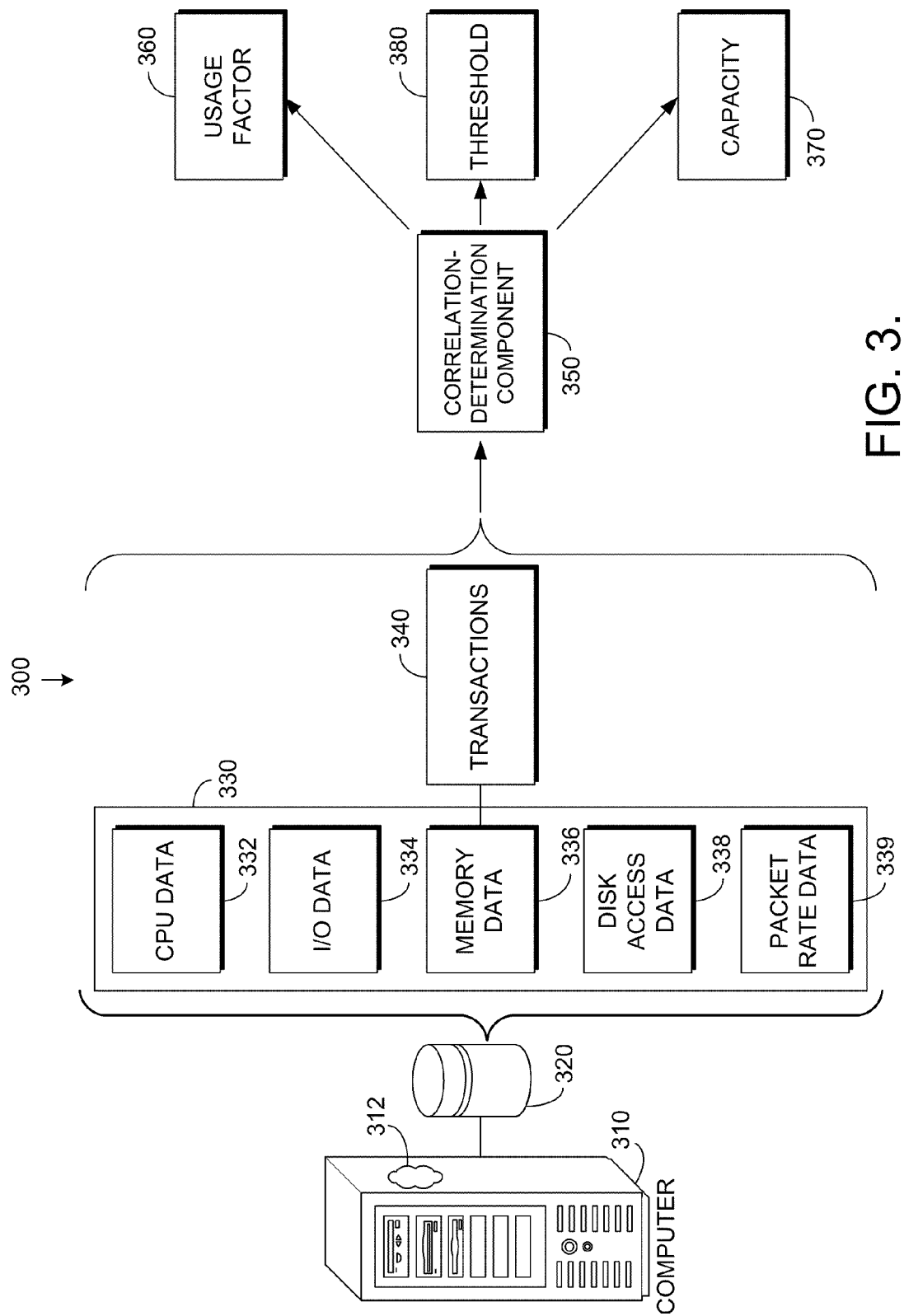
FIG. 3 is a block diagram of an exemplary operating environment suitable for practicing an embodiment of the present invention.

The present invention will be better understood from the detailed description provided below and from the accompanying drawings of various embodiments of the invention, which describe, for example, methods and systems to monitor a plurality of computers, extract relevant data, and implement a methodology to improve system capacity. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, a preferred embodiment will now be referenced in connection with a computing network. Although the present invention can be employed in connection with a computing-network environment, it should not be construed as limited to the exemplary applications provided here for illustrative purposes.

Accordingly, FIG. 1 illustrates an exemplary process for forecasting capacity on a computing device, such as a workstation, server, PC, laptop, dedicated machine, etc. At a step 110, computer-performance data (CPD) is provided from a computer. Computer-performance data includes a variety of types of data that may be collected on a computer. Exemplary performance data includes CPU utilization (including multiple processors or systems), input/output (I/O) utilization, memory utilization, disk-access utilization, and packet-rate utilization. Performance data can be collected and stored in a data structure during user-definable span of time in one embodiment. In other embodiments, thresholds can be set or durations otherwise provided automatically. The performance data provides an indication of the operating efficiency of the computer.

At a step 120, information is provided that is related to transactions performed on a specific computing device. What is considered a transaction can vary. A transaction may be a processed event. It may also include responding to a requested input. A transaction may be the completion of a designated set of tasks. Generally, processing a transaction refers to processing data that is manipulated or otherwise used on the computer. Numerous transactions can occur on a computer due to the instructions received by software executed on the computer or from input initiated by a system administrator or users for example. The transactions may be measured by a client-side software component, or pre-determined by one who knows the number of transactions to occur on the computer.

At a step 130, a determination of correlation values is made using data provided in steps 110 and 120 in one embodiment. Correlation values may be calculated based on computer performance data and transactions information gathered. Various algorithms may be employed such as standard deviation, covariance, and correlation. As used herein, the terms "correlation" and "correlation value" are not limited to the definitions associated with these terms in the area of statistics and statistical analysis.

Correlation is determined between the transaction data (such as number of transactions) and each of the sets of performance data (e.g., CPU usage, I/O, memory, disk-access, and packet-rate data). Thus, several correlation values are generated. For example, a first correlation value is generated that indicates a correlation between the number of transactions performed on a computing device over a span of time and the CPU usage associated with that computing device over the same span of time. A second correlation factor relates the same transaction data to I/O measurements over the same span of time. Similarly, memory usage, disk-access, etc., are compared to the transaction data to generate additional correlation factors. From the set of correlation values generated, the highest correlation value is selected.

The highest correlation value indicates the best relationship between the particular computer performance data and the number of transactions that occurred on the computer for a given period. For example, if the CPU-usage measurements had the highest correlation to the number of transactions processed, then it is the best indicator of computer performance. An increase or decrease in the number of transactions would most closely correspond to changes in CPU performance than changes of other computer performance data. Similarly, if memory usage was most correlated to the number of transactions processed, then it would be the best indicator to extrapolate computer performance. Such correlation may be used to determine the theoretical maximum capacity, as indicated in a step 150.

Although an exemplary method of forecasting a theoretical capacity has been discussed above, steps 110, 120, 130 and 140 may be executed in a different order than that indicated in FIG. 1. For example, rather than providing computer-performance data in step 110 before determining correlation values in step 130, a subset of the computer performance data, like CPU utilization, may be used to find correlation values with iterations made to find other computer performance data. In addition, step 120 may be executed before step 110.

Referring now to FIG. 2, a process is illustrated showing another exemplary embodiment of the present invention. At a step 210, performance data is gathered that relates to a computing device. For the same time period that the performance data is gathered, transactions are monitored in the same computer as indicated in step 220. Both performance data and transaction data (such as count) may be used to calculate correlation indicators, such as covariances (written in plural form for covariance), at a step 230. Covariances can be calculated between transactions and measurements related to CPU, I/O, memory, disk-access, and packet-rate data. From the covariances, correlation measurements may be obtained, from which the highest correlation may be selected as indicated in a step 240.

At a step 250, a utilization factor is determined from the data corresponding to the highest correlation. For example, if memory utilization has the highest correlation of the performance data (i.e. correlation for memory utilization is the highest of the correlation values for disk-access, packet-rate, I/O, and CPU), then the utilization factor may be calculated from the number of transactions divided by the average of the memory utilization or vice versa. Using the utilization factor, calculations may be further made to extrapolate the theoretical maximum capacity.

FIG. 3 illustrates a block diagram of an exemplary operating environment of an embodiment of the invention, and is referred generally by the numeral 300. Operating environment 300 includes a computer 310 (with a performance-measuring component 312) coupled to a data structure such as database 320; computer performance data 330 containing CPU data 332, I/O data 334, memory data 336, disk access data 338, and packet rate data 339; transactions 340; correlation-determination component 350; usage factor 360; capacity 370; and threshold 380.

To provide a specific example of an embodiment of the invention, computer 310 is the device whose maximum capacity is to be determined, without having to go offline. Computer 310 may be any computing device that operates in a standalone mode or in a network. Computer 310 is coupled to database 320 for the storage of information. Database 320 is not vendor-specific and may be procured and configured according to the preferences of the system administrator or user. Performance-measuring component 312 operating on computer 310 enables computing performance data 330 to be gathered and optionally stored in database 320. In other embodiments, the performance data can be directly measured without being stored. An exemplary performance-measuring component 312 suitable for using in the present invention is MEASUREWARE offered by the Hewlett-Packard Company of Palo Alto, Calif. The method of collecting computer performance data 330 is not limited to a particular software program.

Computer performance data 330 may include a variety of functions that measure various performance aspects of computer 310 to provide an indication of the computer's performance ability. As previously mentioned, computer performance data 330 includes, for example, CPU data 332, I/O data 334, memory data 336, disk-access data 338, and packet-transmission-rate data 339. CPU data 332 provides at least one indication of the processor's capability of handling software instructions. I/O data 334 provides at least one informational aspect about how computer 310 processes user-initiated inputs, computer inputs received over a network, and various other outputs of data whether in various forms (print, display, audio, computer instructions sent to another computing device over a network connection, etc.).

Memory data 336 provides information related to computer performance optionally depending on a selection by the system administrator or the user including the computer's ability to store information temporarily without using permanent disk storage as well as the computer's ability to quickly retrieve information from the same. Disk-access data 338 provides information related to the computer's permanent storage capacity or information on the computer's speed in accessing such information. Packet-rate data 339 provides information related to the transfer and size of information. Computer performance data 330 can assume many forms and may be defined, altered, and maintained in accordance with the desires of the system administrator or user. The system administrator or user has great flexibility in determining computer performance data 330 to be gathered for the present invention.

In addition to computer performance data 330, computer 310 may gather data related to transactions 340. Transactions 340 are measurable by independent software or can be measured by performance-measuring component 312 in some embodiments. Transactions 340 may result from a variety of computing activities including the execution of one or more software programs, one or more software programs operating together as software processes, or user-initiated or machine-initiated inputs for example. Transactions 340 impact the operation of computer 310. The degree of impact can be gleaned from examining computer performance data 330. Computer 310 has a maximum number of transactions 340 that it can process. One aspect of the present invention determines this maximum number of transactions for computer 310.

As stated earlier with reference to FIG. 1, transactions 340 may be measured by performance-measuring component 312. In some embodiments, transactions 340 may be predetermined in advance based on knowledge about a software application. For example, a customer having software operations occurring on computer 310 may provide in advance the number of transactions 340 it knows may occur on computer 310. Fulfilling requests associated with customers may impact the processing of transactions 340, by increasing the software load on computer 310 due to growth needs. Such activity makes it desirable to monitor the use of computer 310. When several customers impact computer 310 with their transactions 340, a forecast in capacity becomes critical to know and predict increases in transactions 340.

In FIG. 3, correlation-determination component 350 determines one or more correlation factors by employing various algorithms or derivations, such as standard deviations, covariances, and correlations related to the various computer performance data 330 and transactions 340. Calculations can be made to determine correlation-determination component 350 for measurements such as CPU data 332, I/O data 334, memory data 336, disk-access data 338, and packet-rate data 339. The highest correlation is selected from the set comprising CPU data 332, I/O data 334, memory data 336, disk-access data 338, and packet-rate data 339. The highest correlation indicates the best relationship between the particular computer-performance data 330 and transactions 340. By considering transactions 340 from computer 310 and finding the high correlating relationship with computer performance data 330 such as CPU data 332, I/O data 334, memory data 336, disk-access data 338, and packet-rate data 339, a maximum number of transactions may be calculated. A forecasted maximum capacity 370 may be calculated by normalizing the relationship between the selected computer performance data and the number of corresponding transactions.

An exemplary method of normalizing such data is to derive the quotient of the number of transitions and the chosen performance-data value. For example, if 30,000 transactions took place over a time when the average memory usage rate was 0.34 (or 34%), then the forecasted maximum number of transactions would be 30,000/0.34, or about 88,235. This would represent the maximum capacity of the computer. Capacity 370 represents the maximum number of transactions that may be handled by computer 310. Armed with this data, an administrator may determine whether to acquire more computing devices or divest itself of some devices, all without having to set up a testing environment, nor take the in-use computing devices offline.

In some embodiments, a user-definable threshold 380 may be established as an upper bound limit of the number of transactions 340 to be reached in computer 310 before additional resources or changes are needed. In the computing environment, an administrator or user may want to prevent computer 310 from reaching its full computing capacity as established by capacity 370. This is done to keep the computer functioning with minimum down time. Threshold 380 may be computed as a percentage of capacity 370 to allow for time to improve or increase the computing capacity of computer 310 before it reaches capacity 370. For example, if capacity 370 was calculated to be 48,500 transactions and the highest correlation was based on CPU utilization, then threshold 380 may be established at 90% of capacity for example, or 43,650 transactions. An administrator could use threshold 380 to forecast changes of his or her choosing rather than merely determining when a computing resource would be completely exhausted. If the administrator wishes to adopt a policy whereby no resource is to exceed 80% or even 50% of its capacity (for some reason), then doing so would be easily effected using the present invention.

Figure 4:
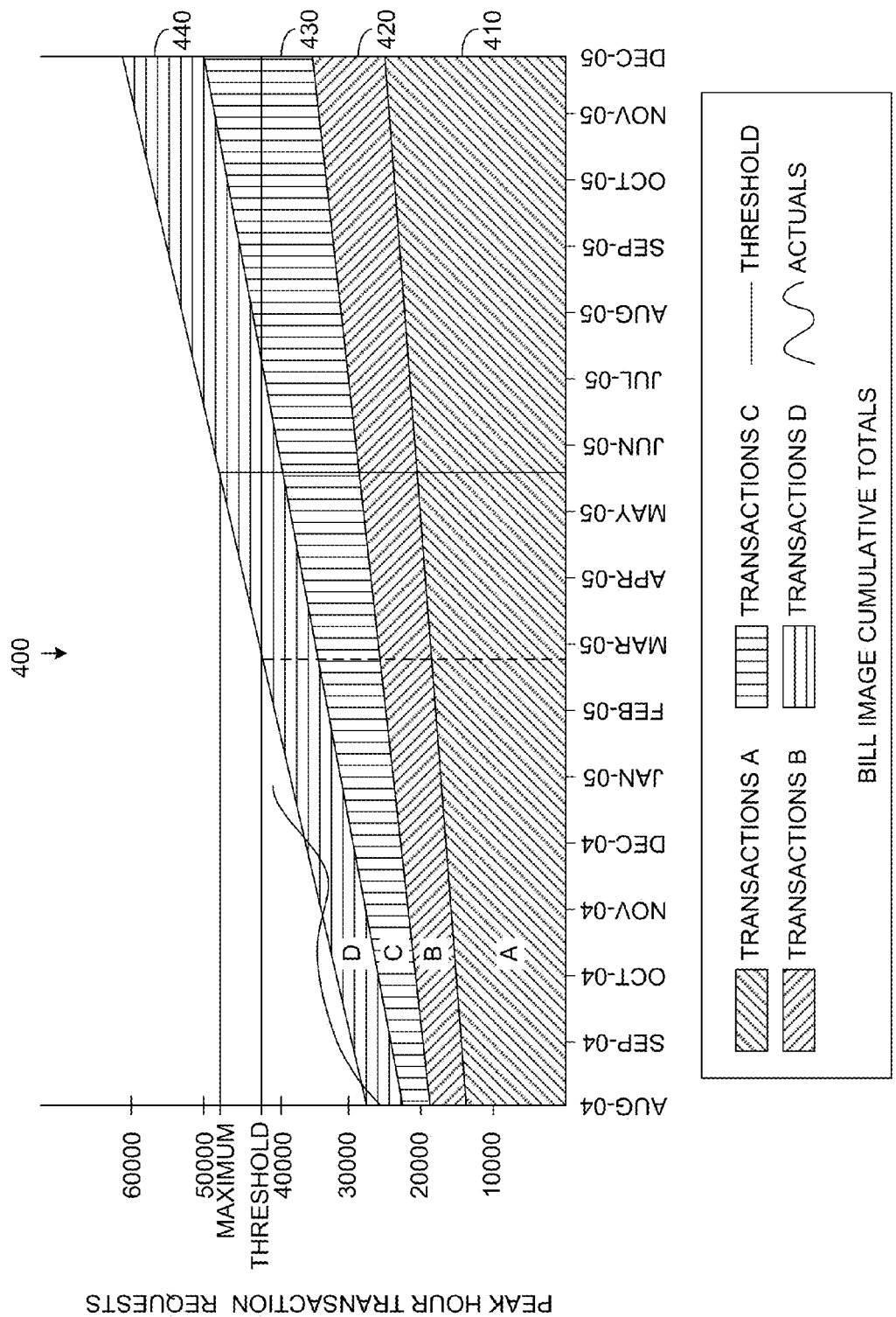
FIG. 4 is an exemplary graph illustrating transaction requests impacting a computer in accordance with an embodiment of the present invention.

Referring now to FIG. 4, an exemplary graph illustrating peak-hour transaction requests is shown in accordance with an embodiment of the present invention. This graph is one of many hundreds of different types of reports that can be generated, and provided for illustrative purposes. The present invention should not be construed as limiting in nature. The graph is a time representation of transactions 340 occurring on computer 310 as discussed in FIG. 3. Various types of transactions 340 may occur on computer 310 as shown by Transactions A 410, Transactions B 420, Transactions C 430, and Transactions D 440. As time extends into each month, the number of transactions 340 increases due to increased usage in computer 310 by customers and increased software demands for processing more software instructions. As the increases continue to occur, one needs to know when computer 310 may reach its maximum capacity.

FIG. 4 indicates both a threshold and maximum capacity for the number of transactions 340. The graph also provides a visual prediction of the increases in transactions 340 which becomes a theoretical view beyond the Maximum identifier. Even if computer 310 may not achieve transaction amounts beyond the maximum, the graph provides a visual representation into the growth needs that may be planned for in the future. For example, one may discern that computer 310 may reach its threshold operating capacity of 43,650 transactions by March 2005. If left unchecked, computer 310 may reach its maximum operating capacity of 48,500 transactions by mid-May 2005. If again left unchecked, computer 310 may cease to function or may have serious service degradation operating beyond mid-May 2005. However, with the graph, one may predict future computer usage and processing to be approximately 60,000 transactions by December 2005 which allows for forecasting and planning of any computer upgrades or changes.

Figure 5:
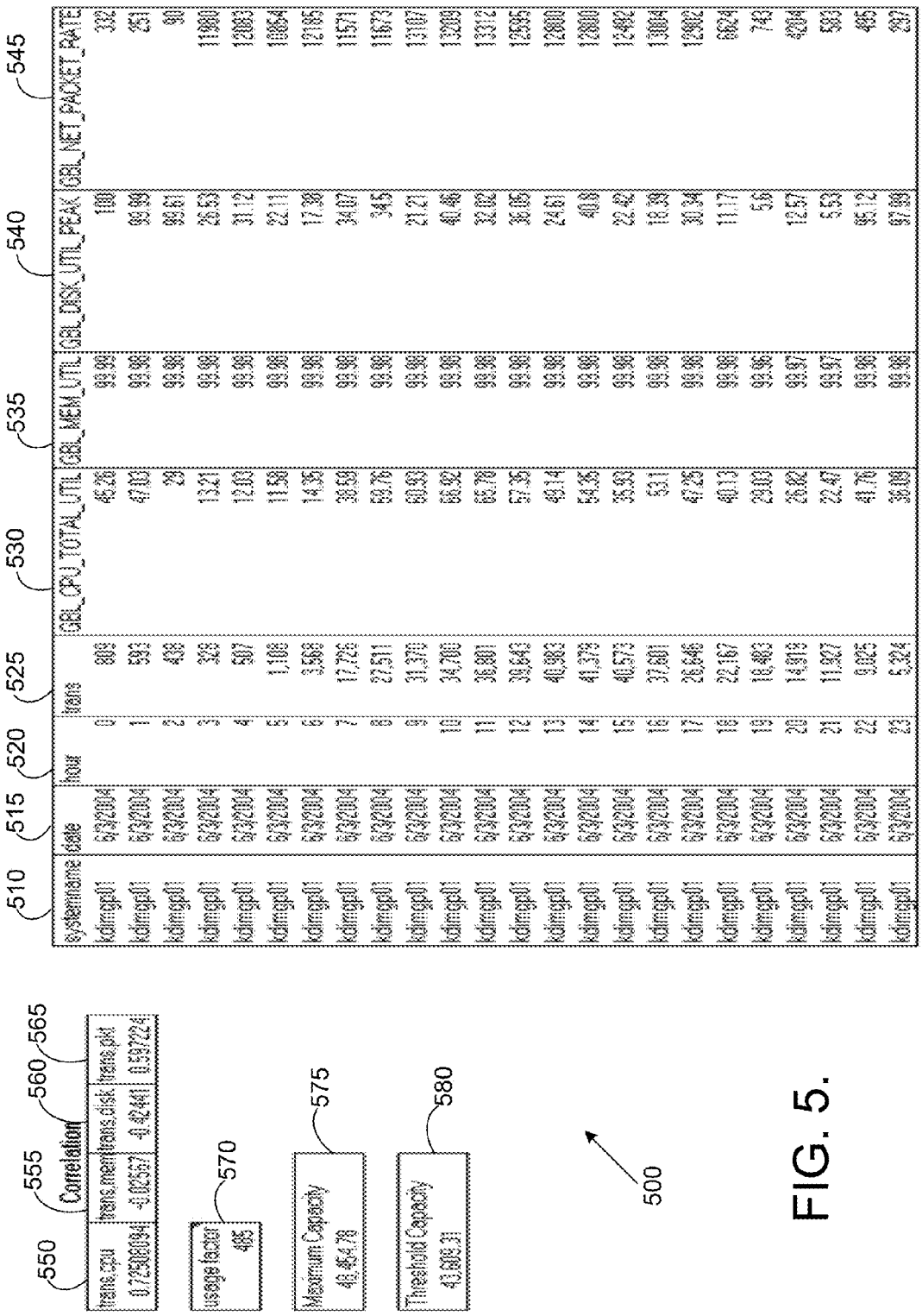
FIG. 5 is an exemplary block diagram of the data output of the operating environment of an embodiment of the invention.

Referring now to FIG. 5, an exemplary block diagram of the data output of the operating environment of an embodiment of the invention is illustrated and is generally referred by the numeral 500. Data output 500 shows an example of the performance data gathered from a computer and the corresponding results associated with the practicing of the present invention. Data output 500 illustrates a series of performance data gathered from computer 510 segmented by dates 515 and time 520. The series of performance data gathered from computer 510 include transactions 525, CPU utilization 530, memory utilization 535, disk-access utilization 540, and packet-rate utilization 545. An example of practicing the present invention using transactions 525, CPU utilization 530, memory utilization 535, disk-access utilization 540, and packet-rate utilization 545 results in CPU correlation 550, memory correlation 555, disk-access correlation 560, packet-rate correlation 565, usage factor 570, maximum capacity 575, and threshold capacity 580.

In FIG. 5, computer 510 is a representative example of a specific computing device as identified by the characters kdimgp01. Computer 510 is the device that provides the performance data and other information to allow the practicing of the present invention. One may note that other computing devices may be used to provide corresponding information to practice the present invention. For computer 510, dates 515 and time 520 illustrate the intervals of time whereby transactions 525, CPU utilization 530, memory utilization 535, disk-access utilization 540, and packet-rate utilization 545 are collected from computer 510. Dates 515 may be set to any specific day for the capturing of information and in this specific example is set for every seven days for the capturing of performance data and information. Correspondingly, time 520 is set to capture performance data and information on an hourly basis. One may change the settings for time 520 to capture information on another span of time.

Performance data and information related to transactions 525, CPU utilization 530, memory utilization 535, disk-access utilization 540, and packet-rate utilization 545 are illustrated respectively to the corresponding dates 515 and time 520. Transactions 525 show an hourly output of the number of transactions occurring on computer 510 for the relevant dates 515 and time 520. CPU utilization 530, memory utilization 535, and disk-access utilization 540 show percentages of their performance data on an hourly basis for the relevant dates 515 and time 520. Packet-rate utilization 545 shows the actual number of packet transmitted and received by computer 510 on an hourly basis for the relevant dates 515 and time 520.

In data output 500, CPU correlation 550 is calculated from CPU utilization 530 and transactions 525; memory correlation 555 is calculated from memory utilization 535 and transactions 525; disk-access correlation 560 is calculated from disk-access utilization 540 and transactions 560; and packet-rate correlation 565 is calculated from packet-rate utilization 545 and transaction 525. From the various correlations, CPU correlation 550 has the highest correlation value among CPU correlation 550, memory correlation 555, disk-access correlation 560, and packet-rate correlation 565. With CPU correlation 550 having the highest correlation value, data corresponding to CPU utilization 530 and transactions 525 are averaged and divided to yield usage factor 570 as shown by the numerical value 485 in FIG. 5. One may note that if CPU utilization 530 is expressed in decimals rather than percent, usage factor 570 would be 48,481.52 corresponding to maximum capacity 575. In the present example, usage factor 570 is multiplied by 100 to obtain maximum capacity 575 since percent numbers are used in the calculation of usage factor 570.

Threshold capacity 580 is computed as a percentage of maximum capacity 580. In the present example, threshold capacity is 90% of maximum capacity 575. However, as discussed in FIG. 3, an administrator could adopt a different policy and set threshold capacity 580 at 80% or even 50% of maximum capacity 575.

In FIG. 6, a flowchart illustrating an exemplary process for determining cost-allocation factors in accordance with an embodiment of the present invention is provided. Several steps in FIG. 6 are similar to steps found in FIG. 1 and shall not be repeated here. FIG. 1 may be referenced for the corresponding information related to the following steps: A step 610 is similar to step 110; a step 620 is similar to step 120; a step 630 is similar to step 130; and a step 640 is similar to step 140.

CPD is separated into fractional-performance data in a step 650. CPD is derived from performance activities occurring on a computing device. The performance activities consist of measuring the resource impact on the running of transactions in applications on the computing device. Because CPD is related to the transactions in this manner, CPD may be separated according to each application running on the computing device. For example, if eight applications are running transactions on the computing device, CPD may be separated into eight fractional-performance data related to the eight applications. The ability to separate CPD into a smaller component like fractional-performance data may be accomplished using a performance-measuring component such as Hewlett Packard's MEASUREWARE program or Hewlett Packard's SERVICE REPORTER program.

The performance-measuring component collects CPD for performance activities occurring on the computing device and tags the CPD to each transaction in each application. Therefore, a segment of the CPD for the computing device, now referred to as fractional-performance data, may be associated to an application with a count of a number of transactions running under it. In the context here, the term "applications" mean transactions grouped together by an identifiable name such as a software process, computer program, project, business logic module, software release, or customer. The definition of the term "applications" is by no means limited to the foregoing information but is illustrative of how the term is used in the present invention and how it is distinguished from the term "transactions."

In a step 660, the number of transactions are counted for each application. One may note that in the computing device, many applications may be running to fulfill numerous tasks. Under each application, there exist transactions running in the computing device. The transactions may have various tasks to accomplish but are associated in some manner to the application. Having knowledge of the number of applications running on the computing device and the number of transactions associated with each applications allows for details to be known in understanding the impact of the transactions on the computing device rather than having just a total number of transactions running on the computing device with no further information. Such information may allow for greater study of the impact of transactions on an application level rather than a system level.

Information related to the fractional-performance data for the applications and the count of the number of transactions for the applications are both stored in a data structure in a step

670. The data store may be any vendor device that may reside internally or externally to the computing device.

At a step 680, cost-allocation factors are determined to apportion usage costs to the applications running on the computing device. Cost allocations factors may be determined for each application since data may be obtained from the data store on the fractional-performance data for each application as well as the count of the number of transactions for each application. For a given application, an average of the number of fractional-performance data collected over a time frame for a given application may be made along with the average number of transactions over the same time frame created for the same application. A ratio may be taken of the averages to give rise to a cost-allocation factor for one application. Multiple iterations or multiple calculations of the invention may give rise to cost-allocation factors for several applications. The cost-allocation factors may be used to apportion usage costs to applications running on the computing device. For example, if a computing device has five applications running on the computing device, a user may compute cost-allocation factors for each application such as: Application A is 0.30; application B is 0.40; application C is 0.20; application D is 0.60; and application E is 0.10. The user probably knows the cost(s) to operate the computing device, say $80,000 for year 2004. As such, the user may multiply the cost-allocation factors by $80,000 to obtain the apportioned usage costs for the applications. In this case, application A's usage cost would be $24,000, application B's usage cost would be $32,000, application C's usage cost would be $16,000, application D's usage cost would be $48,000, and application E's usage cost would be $8,000. It must be noted that cost allocations factors for all the applications running on the computing device do not have to be normalized to total 100%. The user may desire to keep an un-normalized set of cost-allocation factors as a way to cover operating costs, obtain additional funds for unforeseen operating and maintenance costs, and implement equipment provisioning for the computing device. In our example, the total apportioned costs would be $128,000 rather than $80,000.

One skilled in the art will appreciate that methods and systems in accordance with the present invention may be implemented using computer software. Such software may take the form of computer-readable code embodied on one or more computer-readable media. Software implementing the present invention may operate independently, but may also be incorporated with other software or vendor programs. Various software languages may be used to implement methods and systems in accordance with the present invention.

The invention claimed is:

1. A computer-implemented method for determining cost allocation factors wherein all steps are performed by a computer, the method comprising:

(a) identifying one or more sets of computer-performance data related to a number of transactions processed by an application running on a computing device during a first span of time, wherein the one or more sets of computer-performance data comprises at least one of input/output utilization, computer processor unit utilization, memory utilization, disk-access utilization, and packet-rate utilization, and wherein the transactions comprise one or more software instructions running on the computing device;

(b) counting the number of transactions associated with the application;

(c) communicating the one or more sets of computer-performance data and the number of transactions to a data structure;

(d) determining a cost-allocation factor from the one or more sets of the computer-performance data and from the number of transactions, wherein determining the cost-allocation factor comprises:
  obtaining a first average of the one or more sets of computer-performance data over the first span of time for the application,
  obtaining a second average of the number of transactions over the first span of time for the application, and
  creating a ratio of the first average and the second average related to the first span of time for the application; and (e) without user interaction, repeating steps (a), (b), (c), and (d) to determine cost-allocation factors for additional applications running on the computing device.

2. The method of claim 1, wherein the first span of time comprises at least one of seconds, minutes, hours, days, months, and years.

3. The method of claim 2, wherein the computing device comprises at least one of a server, telecommunication switch, and computer.

4. The method of claim 2, wherein the application running on the computing device comprises transactions grouped together by an identifiable name of at least a computing software process, computer program, project, business logic module, software release, and customer.

5. The method of claim 4, wherein the data structure comprises at least one of a database, spreadsheet, storage medium, and array.

6. The method of claim 1, wherein to forecast usage costs comprises multiplying cost-allocation factors by a monetary amount to determine monetary costs apportioned to applications running on the computing device.

* * * * *